(12) United States Patent
Warner

(10) Patent No.: US 9,307,232 B1
(45) Date of Patent: Apr. 5, 2016

(54) CALIBRATION TARGET FOR VIDEO PROCESSING

(71) Applicant: LUCASFILM ENTERTAINMENT COMPANY LTD., San Francisco, CA (US)

(72) Inventor: Paige Warner, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 14/502,647

(22) Filed: Sep. 30, 2014

(51) Int. Cl.
*H04N 17/00* (2006.01)
*G06T 7/00* (2006.01)

(52) U.S. Cl.
CPC ............ *H04N 17/002* (2013.01); *G06T 7/0018* (2013.01)

(58) Field of Classification Search
CPC ..... H04N 17/002; H04N 17/00; H04N 17/02; G06T 7/0018; G06T 7/002
USPC ...................... 348/187, 188, 181; 702/85, 108
IPC ............................................ H04N 17/00, 17/02
See application file for complete search history.

(56) References Cited

U.S. PATENT DOCUMENTS

| | | | |
|---|---|---|---|
| 4,241,349 A | 12/1980 | Connell | |
| D314,736 S | 2/1991 | Ring et al. | |
| 6,377,300 B1 | 4/2002 | Morris et al. | |
| 7,071,966 B2 | 7/2006 | Lu et al. | |
| 7,152,984 B1 | 12/2006 | Hayes | |
| 7,339,159 B2 | 3/2008 | Juh et al. | |
| 7,679,045 B2 | 3/2010 | Benson et al. | |
| D704,900 S | 5/2014 | Childs et al. | |
| 8,937,682 B2 | 1/2015 | Hjelmstrom | |
| 2004/0080447 A1 | 4/2004 | Bas | |
| 2004/0179098 A1 | 9/2004 | Haehn et al. | |
| 2005/0225640 A1 | 10/2005 | Sadano | |
| 2005/0280709 A1 | 12/2005 | Katayama | |
| 2010/0053639 A1 | 3/2010 | Maier | |
| 2010/0259624 A1 | 10/2010 | Li et al. | |
| 2011/0299070 A1 | 12/2011 | Christiansen et al. | |
| 2013/0016223 A1* | 1/2013 | Kim ................. | H04N 17/002 348/187 |
| 2013/0063558 A1 | 3/2013 | Phipps | |
| 2013/0327932 A1 | 12/2013 | Kim et al. | |
| 2015/0288956 A1 | 10/2015 | Mallet et al. | |

FOREIGN PATENT DOCUMENTS

EP          1 483 556 B1      12/2006

OTHER PUBLICATIONS

U.S. Appl. No. 29/503,920, filed by Paige Warner on Sep. 30, 2014.
(Continued)

*Primary Examiner* — Sherrie Hsia
(74) *Attorney, Agent, or Firm* — Kilpatrick Townsend & Stockton LLP

(57) ABSTRACT

An apparatus is disclosed which may serve as a target for calibrating a camera. The apparatus includes a hollow body having an interior surface, an exterior surface and at least one window formed in the hollow body through which the interior surface is visible. A plurality of distinguishable fiducial markers are arranged in a predetermined pattern along the interior and exterior surface of the hollow body. The fiducial markers can be distinguishable such that, for any given image of the target captured by a camera, there is only one position, rotation, distortion value, and focal length for the camera of interest.

19 Claims, 9 Drawing Sheets

(56) References Cited

OTHER PUBLICATIONS

Non-Final Office Action, dated Sep. 2, 2015, for U.S. Appl. No. 14/248,141, filed Apr. 8, 2015, 9 pages.

Office Action dated Aug. 21, 2015 in U.S. Appl. No. 29/503,920, 10 pages.

Notice of Allowance, dated Nov. 10, 2015, for U.S. Appl. No. 29/503,920, filed Sep. 30, 2014, 10 pages.

* cited by examiner

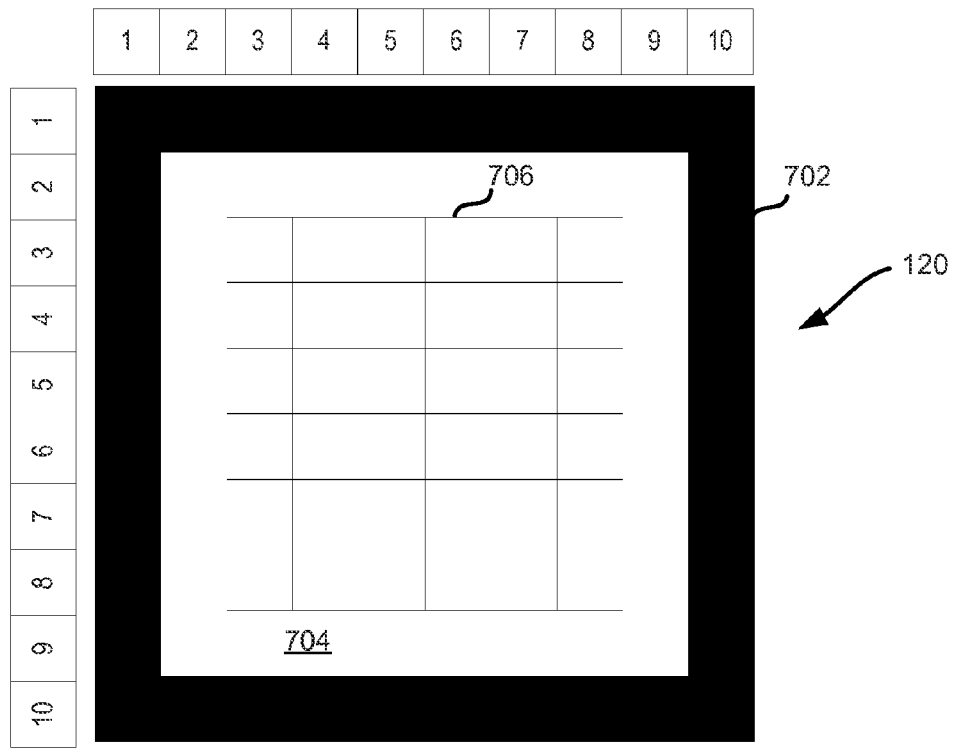
FIG. 7A
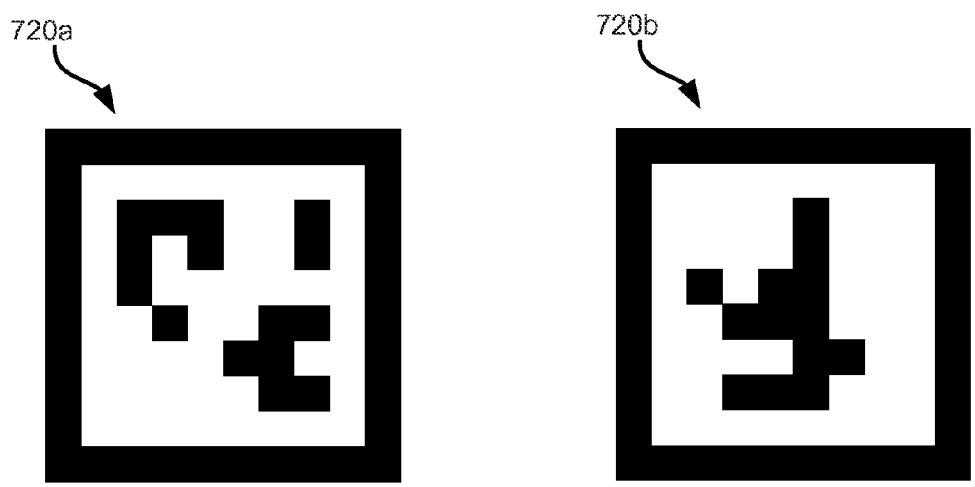
FIG. 7B  FIG. 7C

CALIBRATION TARGET FOR VIDEO PROCESSING

CROSS-REFERENCES TO RELATED APPLICATIONS

This application is related to commonly assigned U.S. patent application Ser. No. 14/248,124, filed on Apr. 8, 2014, and entitled "AUTOMATED CAMERA CALIBRATION METHOD AND SYSTEM," which is incorporated by reference herein in its entirety.

BACKGROUND OF THE INVENTION

A camera creates a record of a three-dimensional (3D) physical scene with a two-dimensional (2D) image. The image may be recorded on a film or as a digital 2D array of pixel values. Computer-based animation techniques often involve capturing a series of images of an actor (or other object) with one or more cameras, which may have different viewing perspectives. The images from these cameras can be combined to generate a three-dimensional (3D) graphical representation of the actor that can be applied to an animated character and placed in a computer-generated 3D scene.

In order for the 3D representation and location of the character in the 3D scene to be accurate, the location of the camera must be able to be accurately reproduced. Towards this end, each camera needs to be calibrated to the 3D graphical representation of the scene. Calibration of a camera to the scene includes determining the intrinsic parameters of the camera and the location of the camera within the scene. Current systems for imaging calibration are relatively slow and inaccurate. Typically an image of a known object (often referred to as a calibration target, calibration apparatus, or calibration tool) is captured and an animator manually maps the object's features to the corresponding computer graphics model to set the orientation of a virtual camera in the 3D model.

Currently known calibration targets may include a known pattern, image or markers formed on one or more surfaces or edges of the target, such as a black and white checkerboard pattern on one or more surfaces of the target or edges that are painted different colors. Once a camera's parameters have been determined by a calibration operation, a calibration target may also serve as a reference for configuring a virtual camera in the 3D representation of the scene in order, in some examples, to create further images of the scene. Despite the availability of a various calibration tools or targets that have been used to calibrate cameras in the past, improvements in the design and modeling of calibration targets are desirable.

BRIEF SUMMARY OF THE INVENTION

Embodiments of the invention pertain to a calibration target with a series of ditinguishable fiducial markers on each of multiple surfaces that enable methods and systems of the invention to automatically identify the precise position of the target in a scene without manual input from a user.

One embodiment of a calibration target according to the invention includes a hollow body having an interior surface and an exterior surface. At least one window is formed in the hollow body through which the interior surface is visible, and a plurality of distinguishable fiducial markers are arranged in a predetermined pattern along the interior and exterior surfaces of the hollow body. The fiducial markers are distinguishable such that, for any given image of the calibration target captured by a camera, based on the position of the calibration target in the image there is only one position, rotation, distortion value, and focal length for the camera. In some instances, the calibration target is approximately the size of a human bust, and/or the calibration target can further include one or more focus-assist patterns interspersed with the fiducial markers. In certain embodiments, the hollow body can include a plurality of planar surfaces joined together to define a perimeter of the body, with each planar surface in the plurality having a planar interior surface that is part of the interior surface of the hollow body and a planar exterior surface that is part of the exterior surface of the hollow body. Further, in some embodiments, the plurality of distinguishable fiducual markers include a first plurality of fiducial markers is arranged on the exterior surface in a first grid pattern and a second plurality of fiducial markers is arranged on the interior surface in a second grid pattern. Each of the first and second grid patterns can include a plurality of similarly sized cells, and in some embodiments, each cell contains either one fiducial marker or one focus-assist marker.

Another embodiment of a calibration target according to the invention includes a hollow body having a plurality of planar surfaces joined together to define a perimeter of the hollow body. Each of the planar surfaces includes a planar interior surface that is part of an interior surface of the hollow body and a planar exterior surface that is part of an exterior surface of the hollow body. A first set of distinguishable fiducial markers is arranged in a predetermined pattern along the exterior surface of the hollow body, and a second set of distinguishable fiducial markers is arranged in a predetermined pattern along the interior surface of the hollow body, where no two fiducial markers in the first and second sets of fiducial markers are identical. At least one window is formed in the hollow body through which the interior surface of the hollow body and at least some of the fiducial markers in the second set are visible. In some embodiments, the hollow body is formed from at least five planar surfaces arranged in different planes, at least eight planar surfaces arranged in different planes or from sixteen planar surfaces, each arranged in different planes.

To better understand the nature and advantages of these and other embodiments of the invention, reference should be made to the following description and the accompanying figures. It is to be understood, however, that each of the figures is provided for the purpose of illustration only and is not intended as a definition of the limits of the scope of the present invention. It is to be further understood that, while numerous specific details are set forth in the description below in order to provide a thorough understanding of the invention, a person of skill in the art will recognize that the invention may be practiced without some or all of these specific details.

BRIEF DESCRIPTION OF THE DRAWINGS

FIGS. 7A-7C are simplified illustrations of fiducial markers that can be incorporated onto a calibration target according to embodiments of the invention;

DETAILED DESCRIPTION OF THE INVENTION

Embodiments of the invention are directed to devices, methods and systems for automatically calibrating a camera. Calibration of a camera entails, in part, determining parameters of a camera related to its focal length, principal point, and other values that affect how the camera produces a two-dimensional (2D) image from a view of points in a three-dimensional (3D) space. Once known, the parameters of the camera may be used in forming or adjusting the images that the camera produces.

Often, calibrating a camera involves producing one or more images or pictures of a test object with the camera, locating components of the image that correspond to particular parts of the test object, and calculating the camera parameters based on the image components, the geometry of the test object, its position relative to the camera when the image was taken, and the physical assumptions about the camera. The test object is sometimes referred to as a calibration target or a calibration tool. Some embodiments of the invention pertain to a calibration target that can be used as part of a system that can automatically perform such a calibration process without manual input from a user.

Figure 1:
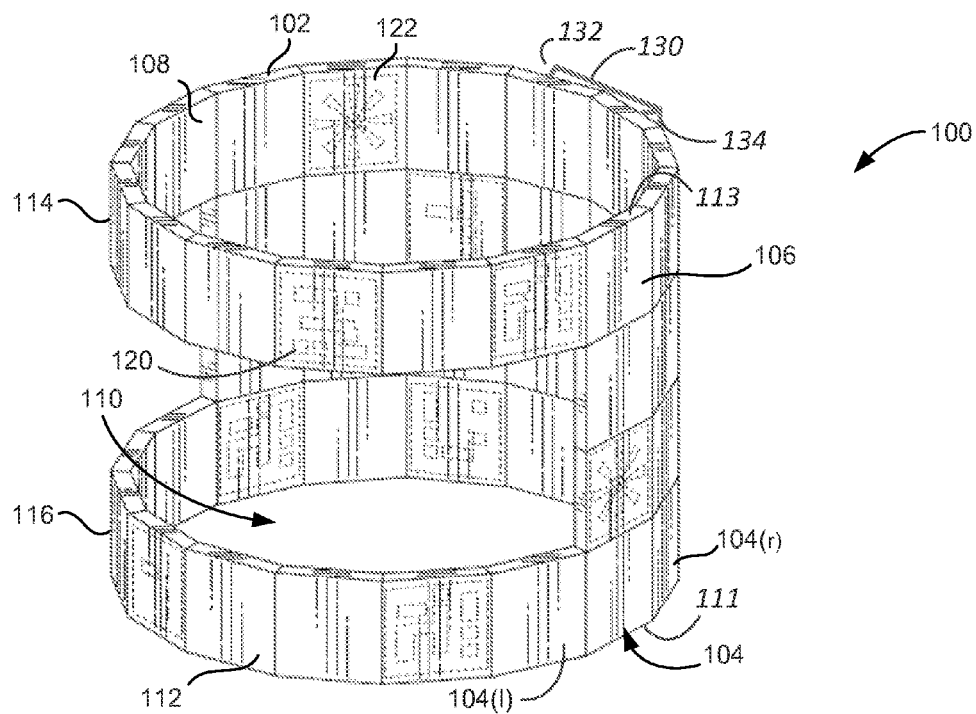
FIG. 1 is a simplified front perspective view of a calibration target according to an embodiment of the invention that can be used to automatically calibrate a camera.
Figure 2:
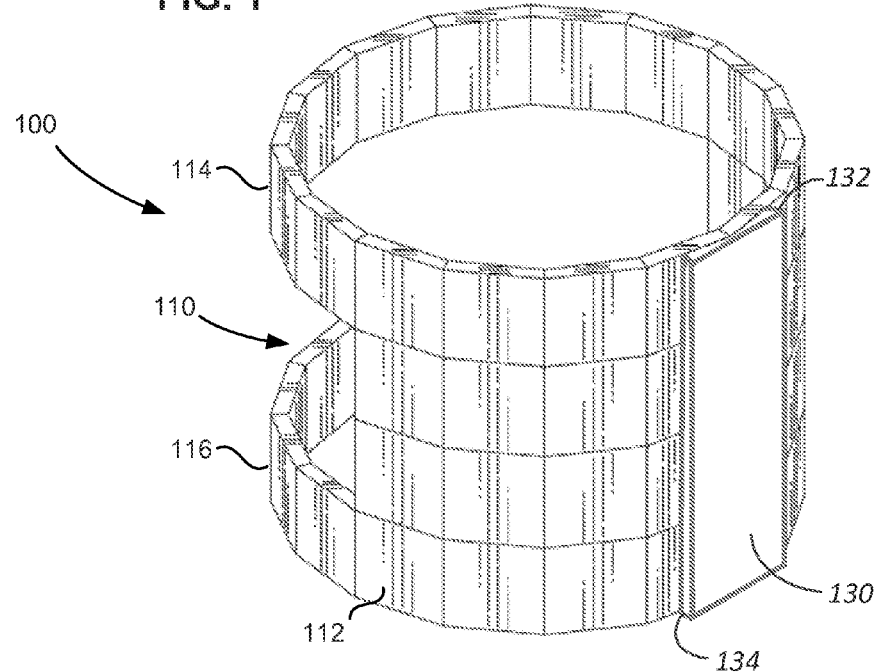
FIG. 2 is a simplified rear perspective view of the calibration target shown in FIG. 1.

In order to better appreciate and understand embodiments of the invention, reference is now made to FIGS. 1 and 3. FIG. 1 is a simplified front perspective view of a calibration target 100 according to an embodiment of the invention that can be used to automatically calibrate one or more cameras, and FIG. 2 is a simplified rear perspective view of calibration target 100. As shown in FIGS. 1 and 2, calibration target 100 includes a hollow body 102 having multiple planar surfaces 104 joined together to define a perimeter of the hollow body. Each planar surface 104 includes an exterior surface and an interior surface where the sum of the exterior surfaces for all planar surfaces 104 generally defines an exterior surface 106 of body 102 and the sum of the interior surfaces of all planar surfaces 104 generally defines an interior surface 108 of hollow body 102.

Each planar surface 104 lies between two adjacent planar surfaces. For example, planar surface 104 labeled in FIG. 1, which extends from a bottom 111 of calibration target 100 to a top 113 of the target, is positioned between two additional surfaces 104, which are referred to herein as surfaces 104(1) and 104(r) for reference. Surface 104 is joined to surface 104(1) at a left edge of surface 104 and a right edge of surface 104(1). Surface 104 is also joined to surface 104(r) at a right edge of surface 104 and a left edge of surface 104(r). Similarly, each additional planar surface 104 includes two similar surfaces 104(1) and 104(r) such that any individual planar surface 104 is itself a surface 104(1) to another planar surface 104 and a surface 104(r) to still a different planar surface 104. The set of planar surfaces 104 form a closed shape that enables calibration target 100 to be a free standing device that can be placed on a table or other support surface and oriented in an upright position without requiring tools or additional support.

A plurality of fiducial markers 120 are provided on both exterior surface 106 and interior surface 108 to provide patterns for recognition by a camera system as explained below. Fiducial markers 120 can be arranged in predetermined locations across some or all of external surface 106 and across some or all of internal surface 108. As shown in FIG. 1, fiducial markers 120 are arranged in a grid pattern on each of exterior surface 106 and interior surface 108 where each grid includes an array of generally square-shaped cells 112. For ease of illustration, only some of fiducial markers 120 are shown in FIG. 1 and no fiducial markers are shown in FIG. 2. Thus, many cells 112 are shown without a fiducial marker. In some embodiments, each and every cell 112 includes a fiducial marker 120. In other embodiments, however, only a subset of cells 112 include fiducial markers.

Figure 3A:
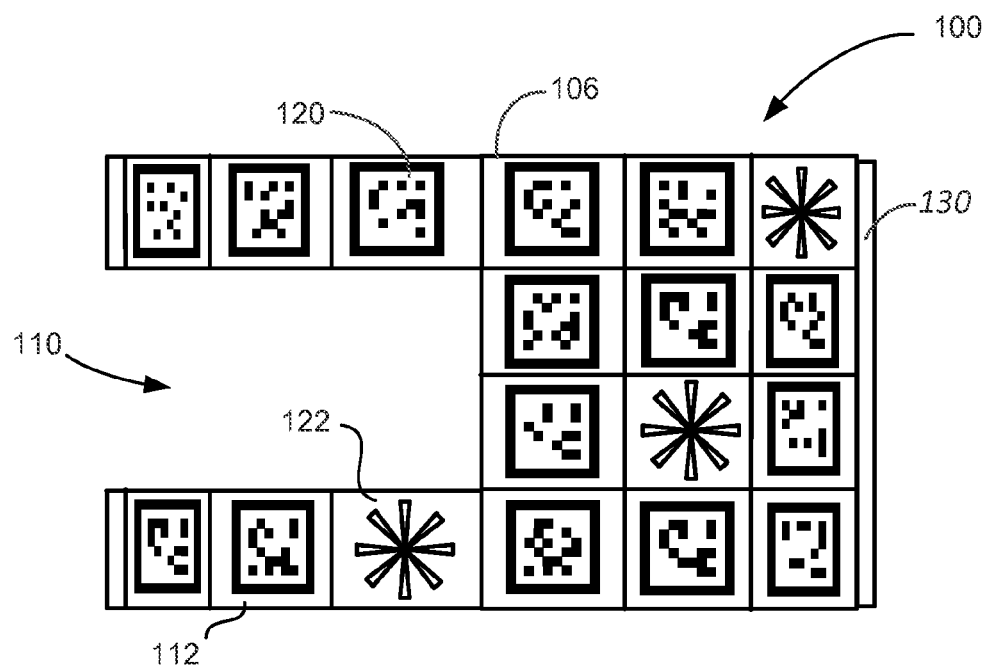
FIGS. 3A and 3B are right and left side plan views of the calibration target shown in FIG. 1, respectively.
Figure 3B:
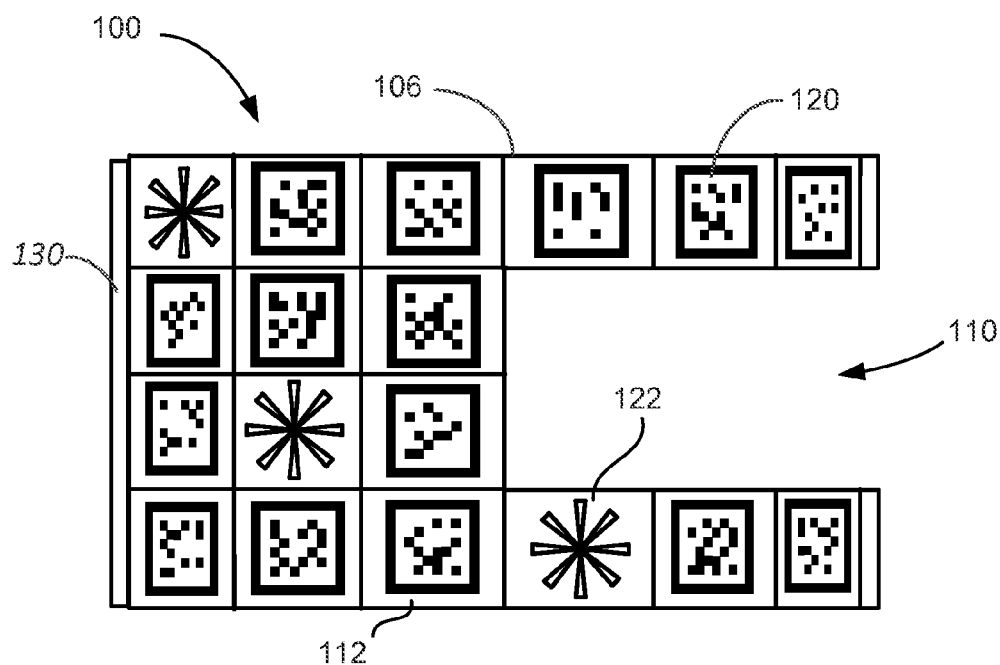

FIGS. 3A and 3B, which are left and right side views of calibration target 100, more clearly show that markers 120 of calibration target 100 are arranged in a grid, four markers high, around the entire exterior surface 106 of the calibration target. As shown, each individual fiducial marker 120 is generally square in shape and has a unique pattern that enables any given fiducial marker to be distinguished from other fiducial markers in the set of markers included on target 100. In other embodiments, fiducial markers 120 can be arranged in predetermined patterns other than a grid. Additionally, in some embodiments where cells 112 are arranged in a grid, each individual cell 112 in the grid need not be a square. For example, the grid may include rectangular, hexagonal, octagonal or other appropriate shaped cells 112, and in some embodiments, individual cells in the grid may be sized or shaped differently from other cells in the grid. In additional and/or alternative embodiments, the fiducial markers may have other geometric shapes, and/or vary in other parameters such as color or size.

Calibration target 100 can also include one or more focus-assist patterns 122 on either or both exterior surface 106 and interior surface 108. Each focus-assist pattern 122 can be positioned in a cell 112 instead of a fiducial marker 120 being positioned in the respective cell(s). When shooting a particular scene there are often multiple cameras pointed towards the scene from multiple angles. Determining accurate focus for each camera, some of which may have a very shallow depth of field, can be very important. Thus, in some embodiments, target 100 includes multiple focus-assist patterns 102 (six are shown in FIGS. 3A and 3B) spaced apart on the target along different planar surfaces 104 such that at least one focus-assist pattern will be within the image capture field of view for each individual camera shooting the scene with calibration target 100 regardless of its position. As shown in FIG. 1, focus-assist pattern 122 is a wheel-and-spoke pattern but other patterns can be used.

Hollow body 102 includes a window 110 that enables fiducial markers 120 and/or focus-assist patterns 122 on interior surface 108 behind the window to be visible to a particular camera view through the window for calibration purposes when such fiducial markers would otherwise be blocked to the camera by exterior surface 106. The combination of window 110 and fiducial markers 120 and/or focus-assist patterns 122 on interior surface 108 provides additional depth perception to certain cameras positioned around calibration target 100 thus enabling more accurate calibration and focus control. Window 110 may further be advantageous in calibrating a camera initially and then for orienting the camera and determining imaging parameters for the camera to be applied to a virtual camera.

Window 110 may be either a transparent material, such as cellophane, acrylic or glass or may be an area void of material. In the particular embodiment of calibration target 100 shown in FIG. 1, window 110 is void of material, is rectangular in shape and is centered between first and second bands 114 and 116 of hollow body 102. Each of bands 114 and 116 completely surrounds an interior space of body 102 in the width and length dimensions, and have a height that is approximately equal to the height of each cell 112. Window 110 has a height that is approximately equal to the height of two cells, but calibration targets according to the present invention are not limited to the precise dimensions of window 110 and/or bands 114, 116 shown in FIG. 1. In other embodiments, window 110 may have different shapes, body 102 may include multiple windows and fewer or more bands, and individual bands, such as bands 114, 116, can have different heights.

Calibration target 100 may be made from a material having sufficient rigidity, such as plastic, cardboard or metal, to enable the device to maintain its shape and readily stand without exterior support. In one embodiment, calibration tool 100 is approximately the same size of a life-size bust of a human head. This can be useful for calibrating cameras, or determining their imaging parameters, in order to obtain accurate images of a human actor, in which inaccuracies would be quickly apparent to a human viewer. In alternative embodiments, calibration targets according to the present invention may be larger or smaller as needed to accurately calibrate a camera to a given scene. Further, calibration target 100 may include one or more markers that indicate the bottom 111 and/or top 113 of the target. Such markers can be used to ensure that, when target 100 is used to calibrate one or more cameras, it is positioned in a known orientation within the scene which assists the software program in identifying the various fiducial markers 120 on target 100 and calculating the relationship between a camera and the target.

In some embodiments, calibration target 100 further includes a spine 130, which is shown in FIG. 2. For ease of illustration, fiducial markers 120 and focus-assist patterns 122 have been intentionally left out of FIG. 2 but can be present in each of the cells 112 as described above with respect to FIG. 1. Spine 130 provides additional for target 100. Additionally, in some embodiments, spine has angled edges 132, 134 that are sized and shaped to be useable with a standard quick-release clamp on a tripod. This enables target 100 to be easily attached to and detached from a tripod and placed in almost any desired position within a scene.

Calibration target 100 can made from a single piece of material or can be made from multiple parts that can be easily assembled and disassembled to facilitate transportation of target 100 from one scene (or movie set) to another. Such an assembly method may also make for efficient application of the fiducial markers on the planar surfaces prior to assembly. For example, body 102 can be made from a flat sheet of plastic having angled grooves cutout from the interior side such that the sheet can be bent in the shape shown in FIGS. 1 and 2 such that the the two opposing ends of the sheet about each other. The ends can be attached using a variety of techniques, and in one embodiment, spine 130 helps secure the ends together. As another example, body 102 can be printed using a 3D printer. In one instance body 102 can be printed as two separate components where a first component includes band 114 and the row of cells 112 directly beneath band 114 and a second component includes band 116 and the row of cells 112 directly above band 114. The two components can be printed with small holes at the top and bottom ends of each planar surface that allow small dowels to be placed in the holes to secure the two components together using a dowel joint. Spine 130 can be printed as a separate component and joined to body 102 to provide additional support and strength. A person of skill in the art will recognize other techniques, including other approaches to 3D printing various components, that can be used to fabricate body 102 and target 100.

Figure 4:
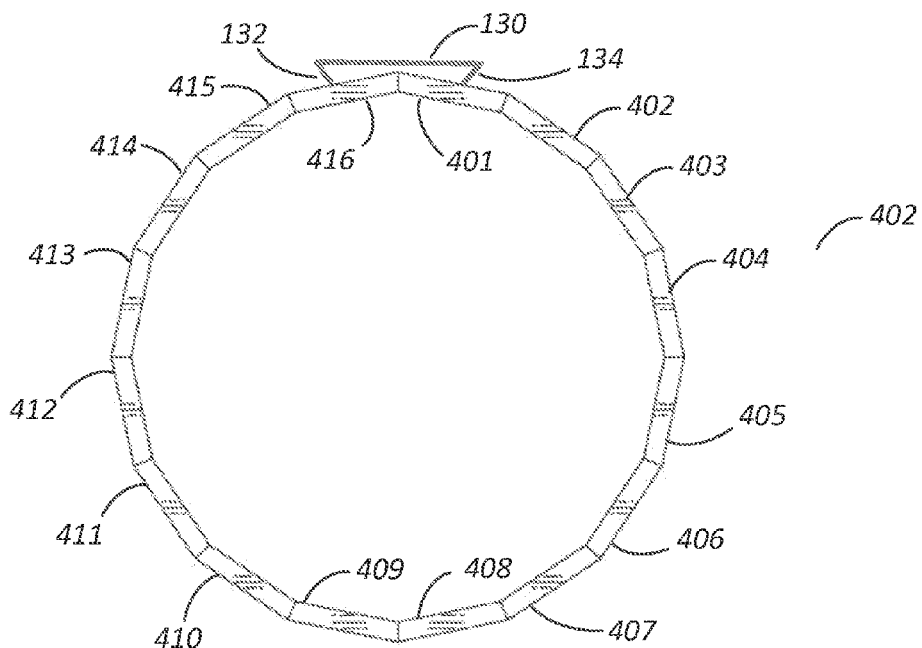
FIG. 4 is a top plan view of the calibration target shown in FIG. 1.

FIG. 4 is a top plan view of calibration target 100. As shown in FIG. 4, target 100 includes 16 separate sides 401-416 of the same length. Sides 401-416 form a closed polygon (a regular hexadecagon) that enables calibration target 100 to be a free standing device so that it can be placed on a table or other support surface in a scene. Each side 401-416 corresponds to one of planar surfaces 104 discussed with respect to FIG. 1, and thus may included one or more fiducial markers on both the interior and exterior surfaces of the side 401-416. The planar nature of sides 401-416 enables software to more readily recognize fiducial markers 120 positioned on each side as the software does not need to correct for curvature or irregularities of a nonplanar surface in performing its recognition route. Additionally, having sixteen sides 401-416, each in a different plane, ensures that any camera directed towards target 100 will capture multiple sides when imaging the target and thus capture multiple fiducial markers at different depths.

Figure 5A:
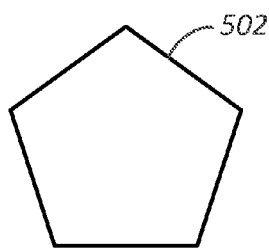
FIGS. 5A-F are top plan views of calibration targets according to other embodiments of the invention.
Figure 5B:
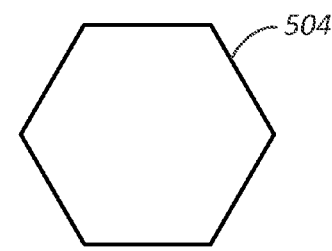
Figure 5C:
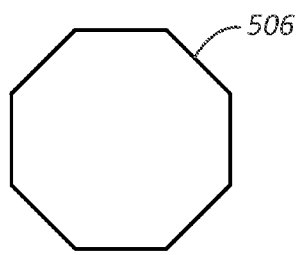
Figure 5D:
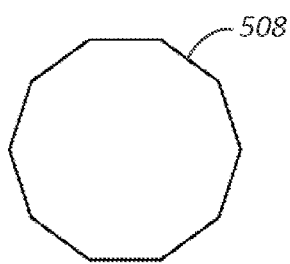

Embodiments of the invention are not limited to any particular shaped body 102, however, and in other embodiments, body 102 may have different cross-sectional shapes. For example, FIG. 5A depicts and embodiment of the invention where a body 502 includes five sides that form a body having a regular pentagon cross-sectional shape (i.e., all angles between adjacent sides are equal in measure and all sides are equal in length). FIG. 5B depicts and embodiment of the invention where a body 504 includes six equal length sides having equal angles and a cross-sectional shape in the form of a regular hexagon. FIG. 5C depicts and embodiment of the invention where a body 504 includes eight equal length sides having equal angles and a cross-sectional shape in the form of a regular octagon, and FIG. 5D depicts and embodiment of the invention where a body 504 includes ten equal length sides having equal angles and a cross-sectional shape in the form of a regular decagon. In some embodiments of the invention, the body of a calibration target includes more than five sides (planar surfaces 104) aligned in different planes, such as each of the bodies 502, 504, 506 and 508 shown in FIGS. 5A-5D. Such embodiments help ensure that when an individual camera is directed towards the calibration target, the camera will capture multiple angles and multiple fiducial markers at different depths regardless of its position with respect to the target (unless it is directly above and pointed directly down towards target), which in turn, makes the algorithm that calculates camera position and properties described below more accurate. In some embodiments, the interior angle between each adjacent planar side is greater than 90 degrees. For example, the interior angle between each side in body 502 is 108 degrees; the interior angle between each side in body 504 is 120 degrees, the interior angle between each side in body 506 is 135 degrees, the interior angle between each side in body 508 is 144 degrees; and the interior angle between each side in body 102 is 157.5 degrees.

Figure 5E:
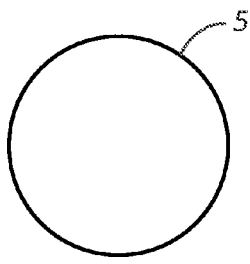
Figure 5F:
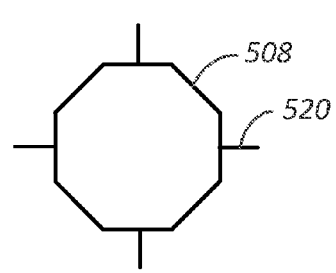

While each of bodies 502, 504, 506 and 508 have a regular polygon cross-section, in other embodiments of the invention, the body may have an irregular closed polygon shape. In still other embodiments, the body of a calibration target according to the invention can have a curved shape, such as the circular shape of body 510 shown in FIG. 5E or an oval shape or other curved shape. In embodiments where the body of a calibration target includes fiducial markers on one or more curved surfaces, the software alrogith that identifies the fiducial markers can be adapted to the particular curvature of the body to facilitate pattern recognition. Additionally, some embodiments of the invention may included one or more wings or extensions that extend from the body, such as the four extensions 520 shown as extending from octagonal shaped body 508 in FIG. 5F. Each extension 520 may included additional fiducial markers 120 and/or focus-assist patterns 122.

Figure 6:
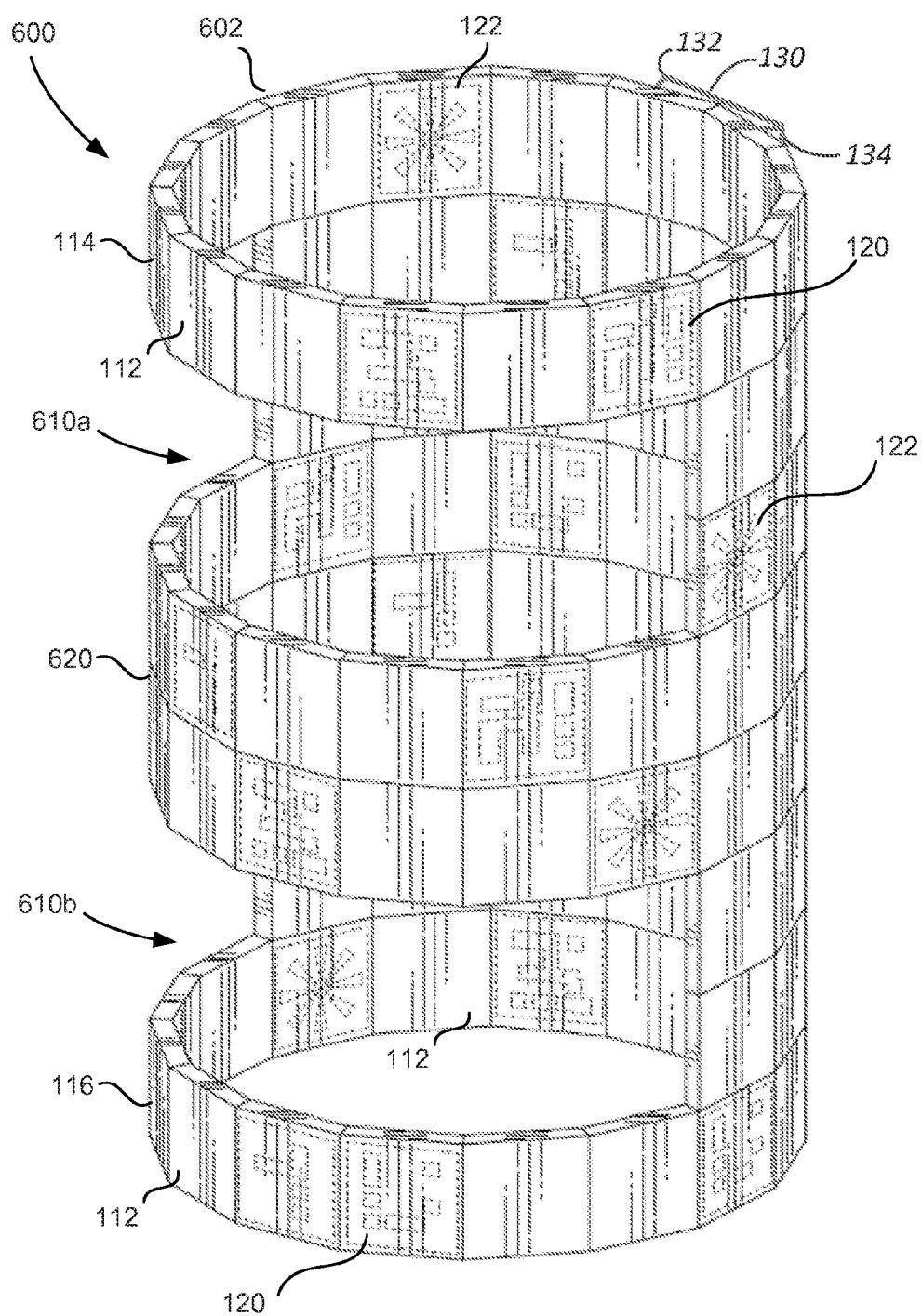
FIG. 6 is a simplified front perspective view of a calibration target according to another embodiment of the invention.

FIG. 6 is a simplified front perspective view of a calibration target 600 according to another embodiment of the invention. Calibration target 600 includes a body 602 and is essentially two separate calibration targets 100 stacked upon each other. In other embodiments, three, four or more calibration targets 100 can be stacked together.

Similar to target 100 and body 102, body 602 includes a predetermined pattern of multiple fiducial markers 120 and one or more pattern-assist features 122 arranged in a grid of cells 112 on both the interior and exterior surfaces of the target. Instead of a single window 110, target 600 includes two separate windows 610a and 610b. Window 610a is bordered by a band 114 on the top and a band 620 below, each of which completely surround an interior space of body 602. Similarly, window 610b is bordered by a band 116 below and by band 620 on top. In the embodiment shown in FIG. 6, bands 114 and 116 each have a height approximately equal to the height of each cell 112, while windows 610a and 610b and band 620 each have a height that is approximately equal to the height of two cells. As shown in FIG. 6, body 602 has a hexadecagon cross-sectional shape. In other embodiments, body 602 and target 600 can have any of the shapes and/or features described with respect to other embodiments of calibration targets according to the present invention.

Reference is now made to FIG. 7A, which shows an embodiment of a single fiducial marker 120 according to an embodiment of the invention. As shown in FIG. 7A, fiducial marker 120 is square in shape and is configured to have a 10-by-10 grid of smaller squares, which can be differently colored. In one embodiment, an outer peripheral band 702 of squares are all colored black or a dark color, and a second inner band of squares 704 interior to but touching the outermost band has a light color to contrast with the black or dark outer band. In one particular embodiment band 702 is black and band 704 is white. Interior to the two bands 702 and 704 is a 6-by-6 grid 706 of smaller squares in which a unique pattern of dark (or black) colored and light colored (or white) smaller squares is created. In some embodiments, some individual fiducial markers 120 included on a particular calibration target 100 have an outer band 702 that is dark and an inner band 704 that is light, while other individual fiducial markers 120 have an outer band 702 that is light and an inner band 704 that is dark. This additional level of variation can help further distinguish individual markers from each other.

In some embodiments of the invention the pattern formed in the 6×6 grid of each and every fiducial marker on calibration tool 100 or 600 is unique. This enables software to distinguish each individual marker from others and identify the exact location of a particular fiducial marker visible to a given camera. FIGS. 7B and 7C depict two examples of fiducial markers 720a and 720b, which can correspond to fiducial markers 120. Fiducial markers 720a, 720b differ from each other in the pattern of black and white squares within grid 720 of each marker, which allows $2^{36}$ distinct patterns of black and white (binary value) subsquares within a fiducial marker with respect to an orientation of the square. However, to allow for rotational equivalences of the square, dividing this by 4 produces a lower bound on the number of rotationally distinct markers.

In the embodiment of calibration target 100 shown in FIG. 1, there are sixteen planar surfaces 104, and the target has a height that allows for four fiducial markers from top to bottom allowing for 8 fiducial markers on each planar surface (4 markers on the exterior surface and 4 markers on the interior surface) that does not include a portion of window 110. Since window 110 covers half the height of target 100 and half the width or length, eight of the planar surfaces 104 allow for 4 fiducial markers. Thus, there would be 8×8+8×4=96 fiducial markers needed not accounting for the inclusion of focus-assist patterns. Double stacked target 600 shown in FIG. 6 would require at most two times the number of fiducial markers as target 100 and would thus require 192 markers. Accordingly, the 6×6 pattern shown in FIG. 7A allows for significantly more than enough possible fiducial markers to be able to use all distinct fiducial markers on the apparatus. Further, various selection processes may be used to choose a set of fiducial markers for the apparatus such that the fiducial markers in the set are not only distinct, and also that any two differ in a large number of the smaller subsquares.

In other embodiments, the fiducial markers may have a rectangular, triangular, circular or other shapes, and/or may include a pattern made up of components other than a grid of similarly sized squares. For example, in some embodiments the fiducial markers may include a plurality of hexagons, pentagons, rectangles, triangles, dots or other shapes within an outer border of the fiducial.

Additional and/or alternative embodiments may include any of the following features. The fiducial markers may contain information within the pattern of dark and light subsquares. The particular sequence of fiducial markers around the border area of a quadrant of a planar surface may also contain information to assist in identification of the fiducial markers, and/or to assist in the calibration of the camera. Particular fiducials which are known to be easily recognized in a camera may be positioned at particular locations on the calibration target to aid in identifying which surface is being viewed.

Calibration target 100 or 600 and their equivalents may be used either to calibrate a camera, and/or to determine imaging properties of a camera, from images taken by the camera. Methods according to the invention use the information available via a captured image of calibration target 100 to increase automation of calibration and other operations. The size of the of the apparatus, including the boundary area surrounding a window, and the size of the fiducial markers and their location on the apparatus may be recorded or known before the calibration target is used.

Figure 8:
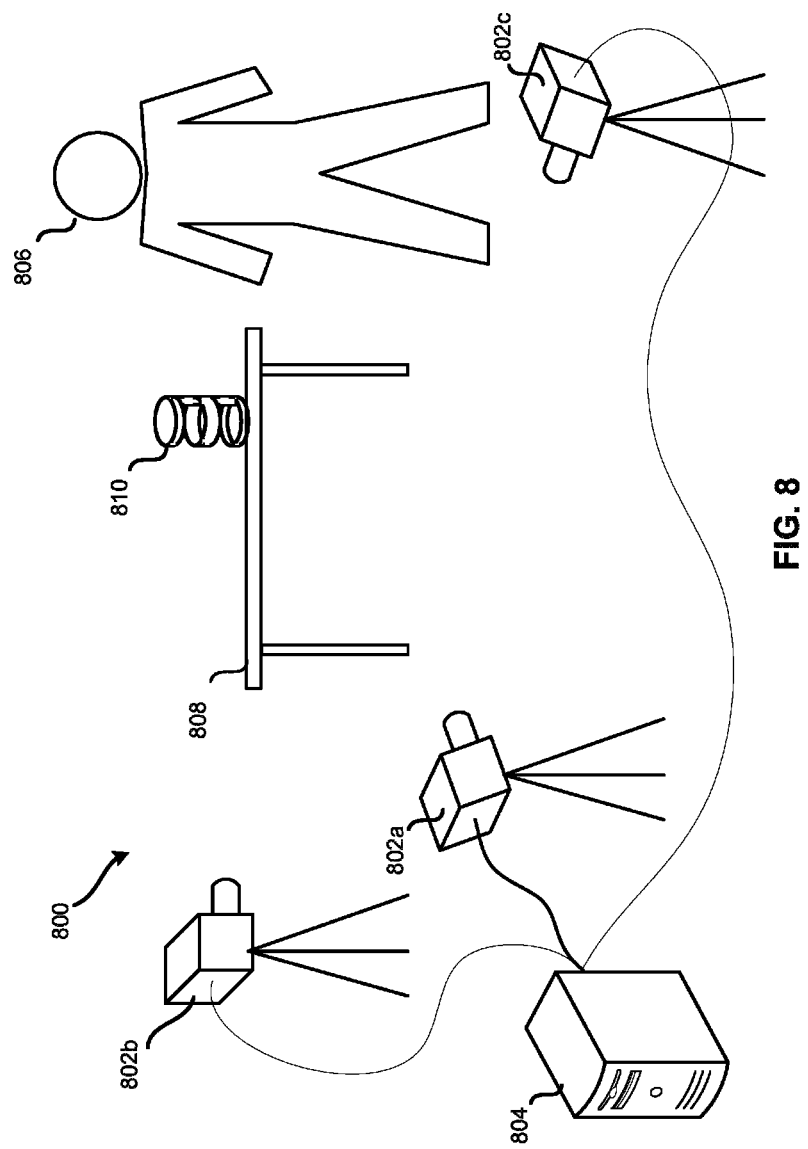
FIG. 8 is a simplified view of the calibration target located in a three dimensional space being imaged from multiple angles by different cameras.

FIG. 8 is a simplified schematic diagram showing a scene 800 in which a calibration target 810 according to the invention can be used for calibrating one or more cameras according to an embodiment of the invention. As shown in FIG. 8, three physical cameras 802a, 802b and 802c, each of which can be, for example, a digital camera, a movie camera, or a video camera, are in use to "shoot" scene 800 which may include one or more actors 806 and/or props 808. Each of the cameras 802a, 802b and 802c are directed to take images of scene 800 while calibration target 810 is positioned in the scene so that it is within the field of view of each camera. In embodiments where target 810 has more than five sides aligned in different planes as described above, each camera 802a, 802b and 802c will capture at least multiple sides and angles of target 810 when the camera is positioned to capture at least some of the exterior and/or interior surface of the target regardless of the angle between the camera and target.

Figure 9A:
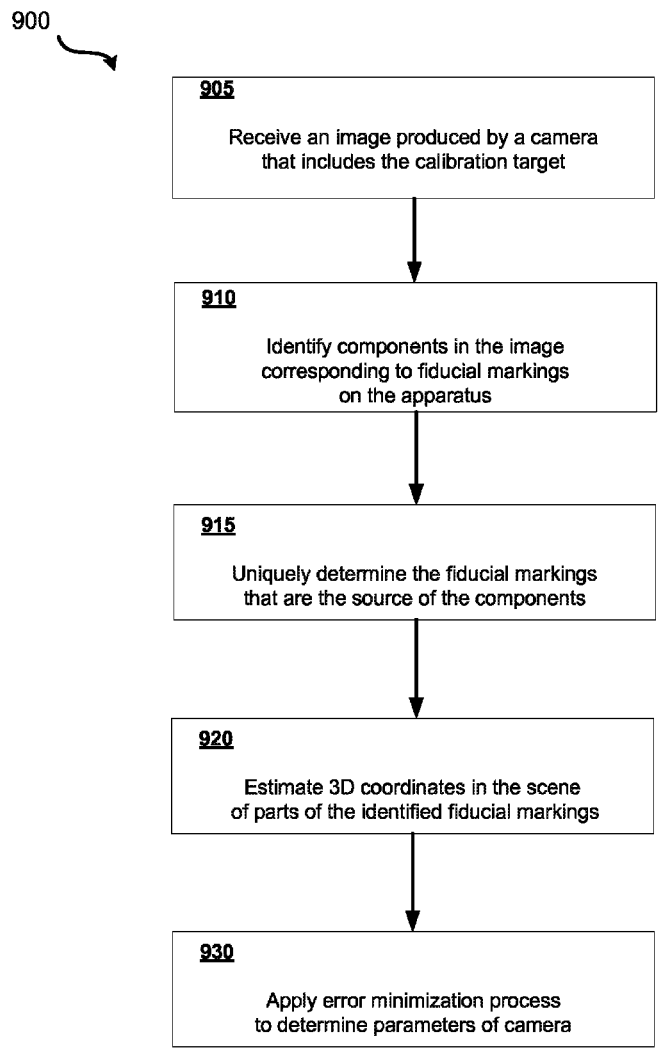
FIG. 9A is a flowchart of a method for calibrating a camera according to an embodiment of the invention.
Figure 9B:
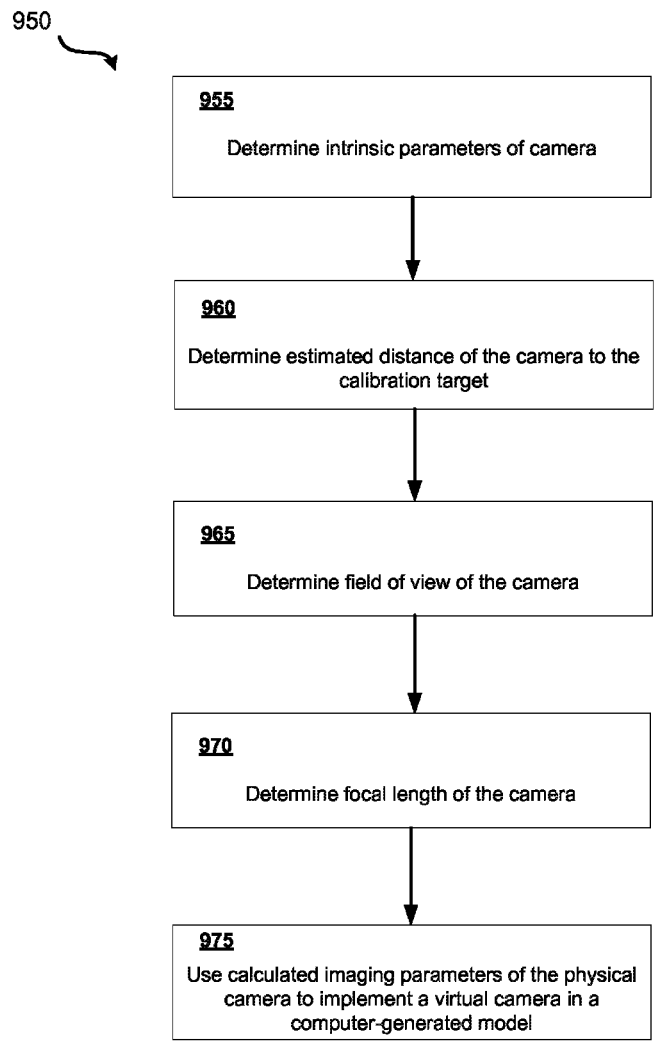
FIG. 9B is a flowchart of a method for calibrating a virtual camera according to an embodiment of the invention.
Figure 10:
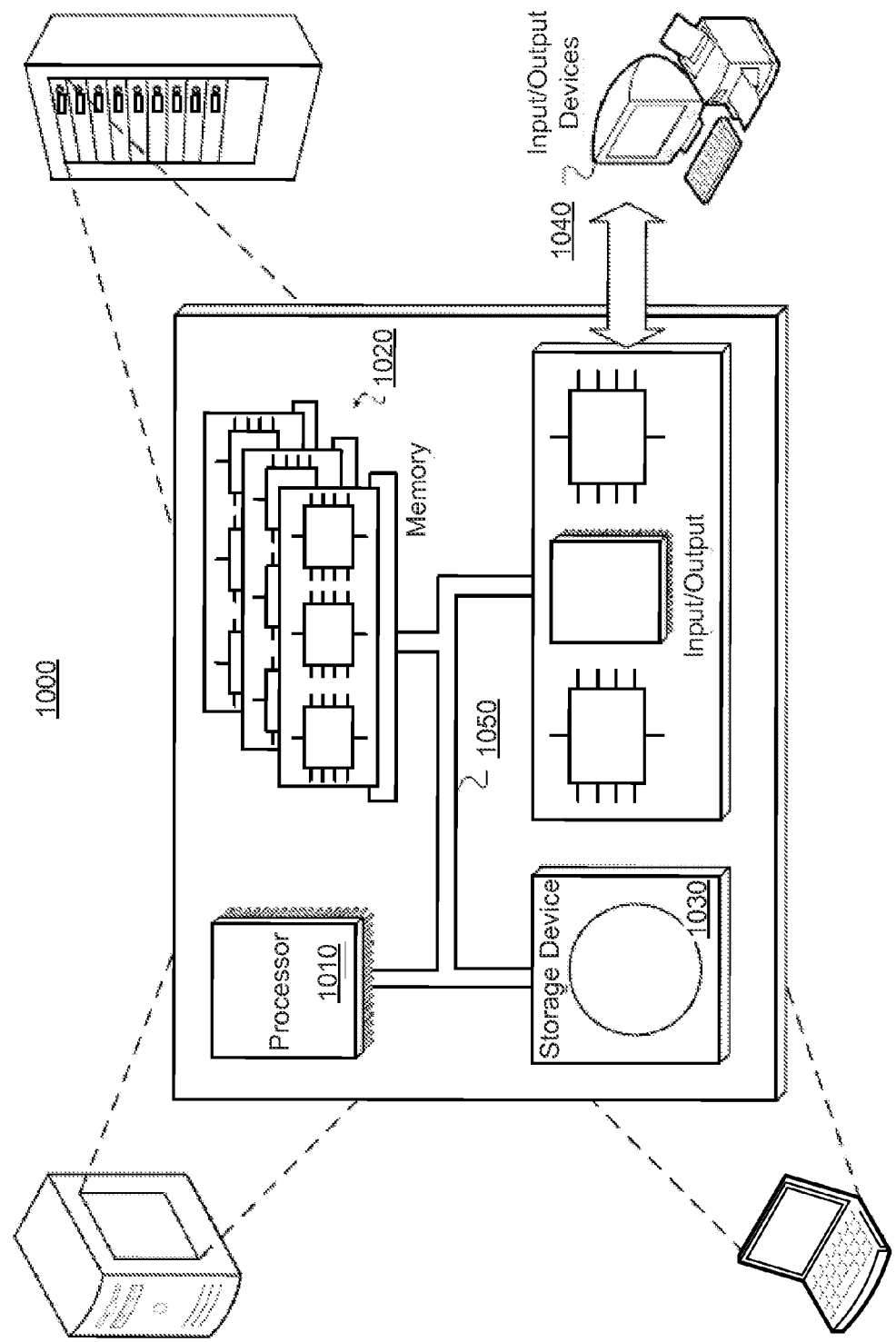
FIG. 10 is a schematic diagram of a computing system that can be used in connection with computer-implemented methods described in this document.

Each camera 802a, 802b, 802c is connected to a processor 804, such as the computer processing system described in FIG. 10. As each camera captures images of the scene including images of calibration target 810, the captured images are sent to processor 804, which stores a computer graphics model of calibration target 810 including the positions and unique patterns of the fiducial markers on the target. Calibration target 810 includes unique fiducial markers, such that, for any given image there is only one position, rotation, distortion value, and focal length for the camera of interest. Thus, without receiving input from a user, processor 804 can compare information from captured images of each of cameras 802a, 802b, 802c to the computer graphics model to identify fiducial markers on calibration target 810, and based on the comparison, determine, among other parameters, the position, rotation, distortion and focal length of each camera with respect to the calibration target 810 and scene as described below with respect to FIG. 9A. Processor 804 can also be used to place a virtual camera in a computer generated 3D scene including setting the virtual camera's position, rotation, distortion and focal length according to the intrinsic and imaging parameters of camera 802a, 802b, 802c as described with respect to FIG. 9B.

FIG. 9A shows a flow chart for a method 900 for calibrating a camera using the calibration target 100 of FIG. 1, or an alternate embodiment thereof. The calibration target 100 may be placed in a physical set depicting a scene. Information regarding the location of the calibration target 100 in the scene, such as which surface of the apparatus is facing the camera, the distance from the camera to a particular point on the apparatus, or other data, may optionally be recorded to assist in the camera calibration. Once the calibration target 100 is positioned in the scene, the camera is directed so as to include the calibration target 100 in an image, and at least one image that includes the calibration target 100 is obtained using the camera. In some embodiments the images are digitally generated, such as by a camera using a charge-coupled device (CCD). In other embodiments the images may be captured on film, and then scanned into digital form. In digital form the pixel coordinates of an image point can be determined. The image is then received at a computational device or system capable of analyzing images and image data (block 905).

Each image captured for calibrating a camera may include a 2D array of pixels, and may be enumerated using pixel coordinates. Pixel coordinates may be normalized or converted to homogeneous coordinate form. An identification procedure is performed on an image in order to identify parts of the image that correspond to particular fiducial markers (block 910). That is, the parts or segments of the image are identified for which a fiducial marker on the calibration target was the source in the physical scene. Such a procedure may involve one or more pattern recognition algorithms. When the embodiment of FIG. 1 is used, the fact that the fiducial markers are square and unique may be used as part of the pattern recognition algorithm. In the case that the fiducial markers are as disclosed in relation to FIG. 7A, the pattern recognition algorithm may use the known information about the bands to assist in identifying the image of fiducial markers within the captured image.

The pattern recognition algorithm may determine a plurality of parts of the image corresponding to fiducial markers, but with varying levels of certainty that a fiducial marker is the source. The identification procedure may choose a sufficient number of the image parts having sufficient certainty of corresponding to fiducial marker. In one embodiment, only fiducial markers that are fully visible in an image are chosen for analysis by the pattern recognition algorithm. Thus, for example, a fidicual marker that is only partially visible through a window 108, may be excluded form the pattern recognition algorithm in order to increase the effectiveness of the algorithm. Also, when target 100 includes one or more focus-assist patterns 122 at known locations, the pattern recognition algorithm may identify the location of such focus-assist patterns and use that information in identifying fiducial markers and/or in calculating the position and orientation of target 100 in the set.

Once a part of image has been identified as the image of a fiducial marker on the calibration target, in the case that each fiducial marker of the calibration target is unique, pattern matching algorithms or pattern recognition operations that compare the image to a computer model of the calibration target including its fiducial markers may be used to uniquely determine which of the fiducial markers was the source for that part of the image (block 915). Nonlimiting examples of such pattern matching algorithms include the discrete Fourier transform, the Hough transform and wavelet transforms. In some embodiments of the calibration target 100, the fiducial markers may be chosen to have easily recognized and distinguished transforms. Known relative locations of the fiducial markers on the calibration target may be used as part of the pattern recognition operations.

Once a part of the image has been identified as a fiducial marker, and the identification of the particular fiducial marker has been determined, one or more specific features of the fiducial marker may be located in the image. In embodiments that use the calibration target of FIG. 1 with fiducial markers as in FIG. 7A, the specific features may be one or more of the corners of the fiducial marker.

In some embodiments of the method, subimages of multiple fiducial markers are identified within the image, the corresponding unique fiducial markers are determined, and specific features of each fiducial marker are selected. As an illustrative example, for the calibration target 100 shown in FIG. 1 with fiducial markers as shown FIG. 7A and described above, multiple components of the image corresponding to fiducial markers may be identified, the respective source fiducial marker uniquely determined, and the corners of those fiducial markers selected as source points. A set of 2D image coordinates, such as either pixel coordinates or homogeneous coordinates, of the source points is then obtained.

Using the set of 2D image coordinates of the source points, reprojection of the set 2D image coordinates of the source points is performed to determine a corresponding set of estimated 3D coordinates for the location in the 3D scene of the source points of the selected features (block 920). The known sizes and orientations of the fiducial markers, both relative to each other, and relative the calibration target 100 as a whole, may be used to determine an estimated configuration of the calibration target 100 in the 3D scene. Other information may also be used, such as the overall outline and dimension of the calibration target 100, and information independently determined regarding the image, for example a known distance between the calibration target 100 and the camera when the image was generated.

Using the set of estimated 3D coordinates and the estimated configuration of the calibration target 100, an error minimization operation is performed to determine an estimate for the intrinsic parameters of the camera (block 925). In one embodiment, a known relationship connecting world coordinates of a point in the 3D scene and corresponding point in the 2D pixel coordinate space is:

$$z_c[u,v,1]^T = A[RT][x_w,y_w,z_w,1]^T \qquad [1]$$

In this equation, $[u,v,1]^T$ denotes the pixel coordinates on the image plane of an image point using homogeneous coordinates, $[x_w, y_w, z_w, 1]^T$ are the 3D world coordinates of the original source point in homogeneous coordinates, R and T represent extrinsic parameters which transform a point's 3D world coordinates to the camera's 3D coordinates, with R being a rotation matrix. The parameter $z_c$ is a constant of proportionality. The matrix A comprises the intrinsic parameters of the camera. It is given by:

$$A = \begin{pmatrix} a_x & \gamma & u_0 \\ 0 & a_y & v_0 \\ 0 & 0 & 1 \end{pmatrix}.$$

Here, $a_x$ and $a_y$ are related to the camera's focal length and scale factors that relate distance to pixels. The intrinsic parameter $\gamma$ is a skew coefficient. The values $u_0$ and $v_0$ represent the principal point.

Nonlimiting examples of error minimization operations include gradient descent, the Levenberg-Marquardt algorithm, and the Gauss-Newton algorithm. The error minimization operation may use the known relative positions of the uniquely determined fiducial markers as criteria for error minimization. In additional and/or alternative embodiments, the method 800 may be iterated using the an initial estimate of the intrinsic parameters to improve the reprojection estimates and the estimation of the intrinsic parameters. In additional and/or alternative embodiments, the method 900 may be applied to multiple images to obtain improve estimates.

The exemplary steps shown in method 900 are capable of being performed within a computing system without a user once a digital image is obtained by the system. A user is not needed to view the image on a display and enter identification of particular 2D coordinates and corresponding 3D locations. In various embodiments the uniqueness of the fiducial markers and the pattern recognition algorithms, together with error minimization algorithms, allow a computing system to proceed without needing user input. However, it will apparent to one of skill in the art that the method 900 may be implemented in conjunction with user input at any stage to improve overall performance.

The methods just described refer to only one image, but it is clear to a person of skill in the art that using a sequence of different images of the calibration target and proceeding as above to generate successive estimates for the parameters of the camera would allow better refinement of the values for the camera parameters. In some embodiments, different images may be used which show the calibration target from different orientations and/or from different distances. In one embodiment, the successive estimates for parameters of the camera may be weighted and averaged to obtain a single estimate for the camera's parameters.

Once a camera's intrinsic parameters are known, such as by the calibration method just disclosed, a calibration target 100 may also be used to determine camera imaging parameters used in the capture of subsequent images. The imaging parameters may then be used by a virtual camera within a computing system. One embodiment according to the invention for placing a virtual camera within a computer generated graphics scenes is set forth in FIG. 9B as method 950. As shown in FIG. 9B, at least one digital image of a 3D scene containing the calibration target 100 is obtained from a camera and the camera's intrinsic parameters are determined from the at least one image (block 955). The procedure for determining the camera's intrinsic parameters includes, as described above with respect to FIG. 9A, locating, by a computing system, components of the digital image corresponding to a fiducial marker, uniquely identifying the fiducial marker from among all the fiducial markers known to be on the calibration target 100, identifying 2D image components of parts or points of the identified fiducial markers, reprojecting the 2D parts into a representation of the 3D scene, and obtaining estimates for at least one of the position, the location, and the orientation of the calibration target 100 in the representation of the scene.

In an exemplary embodiment, method 950 further includes determining an estimated distance from the camera to the calibration target 100 (block 960). The overall dimensions of the calibration target 100, in addition to the estimated 3D locations of the source points on the identified fiducial markers, can be used in the determination. Well known operations such as triangulation based on known geometric values of the calibration target 100 and its fiducial markers may be used.

In an exemplary embodiment, the method further includes determining the field of view of the camera that produced the received 2D image (block 965). In one embodiment an estimated distance between the camera and the calibration target 100 may be obtained, as described, and used in conjunction with an observed height or width of the calibration target 100 or its fiducial markers within the 2D image to determine a vertical, horizontal and/or diagonal viewing angle of the camera.

The focal length of the camera may also be calculated (block 970). As described previously, the intrinsic parameters of the camera contain information from which the focal length may be calculated. In additional and/or alternative embodiments, the focal length may be obtained using the field of view and the relationship between the field of view and the focal length.

The imaging parameters of the camera obtained from a digital image of a 3D scene may be used to implement in a computer system a virtual camera that replicates the performance of the physical camera that obtained the original image or images (block 975). The virtual camera may be used to create animation scenes based on original physical 3D scene.

FIG. 10 is a schematic diagram of a generic computer system 1000. The system 1000 can be used for the operations described in association with any of the computer-implement methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. As will be understood by those skilled in the art, the present invention may be embodied in other specific forms without departing from the essential characteristics thereof. For example, while embodiments of the calibration target according to the present invention were discussed above with respect to calibration target 100 having a particular shape, the invention is not limited to any particularly shaped calibration target and calibration targets having other regular or irregular polygonal cross-sectional shapes are possible. Those skilled in the art will recognize, or be able to ascertain using no more than routine experimentation, many equivalents to the specific embodiments of the invention described herein. Such equivalents are intended to be encompassed by the following claims.

What is claimed is:

1. A calibration target comprising:
a hollow body having an interior surface and an exterior surface;
at least one window formed in the hollow body through which the interior surface is visible;
a plurality of distinguishable fiducial markers arranged in a predetermined pattern along the interior and exterior surfaces of the hollow body, the fiducial markers distinguishable such that, for any given image of the calibration target captured by a camera, based on the position of the calibration target in the image there is only one position, rotation, distortion value, and focal length for the camera.

2. The calibration target set forth in claim 1 wherein the plurality of distinguishable fidicual markers include a first plurality of fiducial markers is arranged on the exterior surface in a first grid pattern and a second plurality of fiducial markers is arranged on the interior surface in a second grid pattern.

3. The calibration target set forth in claim 2 further comprising a plurality of focus-assist markers interspersed with the first plurality of unique fiducial markers in the first grid pattern.

4. The calibration target set forth in claim 2 wherein the first grid pattern includes a first plurality of identically sized sections, each section in the first plurality of identically sized sections containing either one fiducial marker or one focus-assist marker, and wherein the second grid pattern includes a second plurality of sections, each section in the second plurality of sections having approximately the same dimensions as sections in the first plurality of sections and containing either one fiducial marker or one focus-assist marker.

5. The calibration target set forth in claim 2 wherein the hollow body comprises a plurality of planar surfaces joined together to define a perimeter of the hollow body, each planar surface in the plurality of planar surfaces having a planar interior surface that is part of the interior surface of the body and a planar exterior surface that is part of the exterior surface of the body.

6. The calibration target set forth in claim 5 wherein an angle formed between each adjacent planar surface in the plurality of planar surfaces is greater than ninety degrees.

7. The calibration target set forth in claim 6 wherein each planar surface in the plurality of planar surfaces has the same width and the perimeter of the hollow body is equal to the width of the planar surfaces times the number of planar surfaces in the plurality of planar surfaces.

8. The calibration target set forth in claim 1 wherein each fiducial marker comprises a grid of cells with each cell in the grid representing a binary value.

9. The calibration target set forth in claim 8 wherein, for each fiducial marker, the grid of cells is surrounded by an outer row of cells with each cell in the outer row having the same binary value.

10. The calibration target set forth in claim 1 wherein the plurality of fiducial markers are configured and arranged such that, for any given image of the calibration target captured by a camera, there is only one position, rotation, distortion value, and focal length for the camera.

11. A calibration target comprising:
a hollow body comprising a plurality of planar surfaces including at least five planar surfaces joined together to define a perimeter of the hollow body, each planar surface in the plurality of planar surfaces having a planar interior surface that is part of an interior surface of the hollow body and a planar exterior surface that is part of an exterior surface of the hollow body;
at least one window formed in the hollow body through which the interior surface of the hollow body is visible;
a first plurality of unique fiducial markers arranged in a predetermined pattern along the exterior surface of the hollow body; and
a second plurality of unique fiducial markers arranged in a predetermined pattern along the interior surface of the hollow body, wherein no two fiducial markers in the first and second pluralities of unique fiducial markers are identical.

12. The calibration target set forth in claim 11 wherein the hollow body further comprises first and second bands that completely surround an interior space of the hollow body in the width and length dimensions, and wherein the at least one window is formed between the two bands.

13. The calibration target set forth in claim 11 wherein:
the first plurality of fiducial markers is arranged on the exterior surface in a first grid pattern comprising a first plurality of identically sized cells, each cell in the first plurality of identically sized cells containing either one fiducial marker or a focus-assist marker; and
the second plurality of fiducial markers is arranged on the interior surface in a second grid pattern comprising a second plurality of cells, each cell in the second plurality of cells having approximately the same dimensions as the cells in the first plurality of cells and containing either one fiducial marker or one focus-assist marker.

14. The calibration target set forth in claim 13 wherein the hollow body further comprises first, second and third bands that completely surround an interior space of the hollow body in the width and length dimensions and first and second windows, wherein the first window is formed between the first and second bands and the second window is formed between the second and third bands.

15. The calibration target set forth in claim 13 wherein the first and third bands each have a height equal to a width of one cell in the grid of cells and the second band has a height equal to twice a width of one cell in the grid of cells.

16. The calibration target set forth in claim 11 wherein the plurality of planar surfaces includes at least eight planar surfaces joined together to define a perimeter of the hollow body, and wherein each planar surface in the plurality of planar surfaces has the same width and the perimeter of the hollow body is equal to the width of the planar surfaces times the number of planar surfaces in the plurality of planar surfaces.

17. The calibration target set forth in claim 16 wherein the hollow body is formed from sixteen planar surfaces joined together to define a perimeter of the hollow body and wherein a cross-sectional shape of the hollow body is in the shape of a hexadecagon.

18. The calibration target set forth in claim 11 further comprising a spine attached to the hollow body at one or more of the planar surfaces in the plurality of planar surfaces, the spine extending along a majority of a height of the hollow body and having a cross-sectional shape that enables the spine to be attached to a camera tripod.

19. The calibration target set forth in claim 11 wherein each interior angle formed between adjacent planar surfaces is greater than 90 degrees.

* * * * *